US011514165B2

(12) United States Patent
Tonry et al.

(10) Patent No.: US 11,514,165 B2
(45) Date of Patent: Nov. 29, 2022

(54) SYSTEMS AND METHODS FOR SECURE CERTIFICATE USE POLICIES

(71) Applicant: Dell Products L.P., Round Rock, TX (US)

(72) Inventors: Richard M. Tonry, Austin, TX (US); Ibrahim Sayyed, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 194 days.

(21) Appl. No.: 17/025,833

(22) Filed: Sep. 18, 2020

(65) Prior Publication Data
US 2022/0092187 A1 Mar. 24, 2022

(51) Int. Cl.
*G06F 21/57* (2013.01)
*G06F 21/33* (2013.01)

(52) U.S. Cl.
CPC ............ *G06F 21/572* (2013.01); *G06F 21/33* (2013.01); *G06F 21/575* (2013.01); *G06F 2221/034* (2013.01)

(58) Field of Classification Search
CPC ........ G06F 21/33; G06F 21/44; G06F 21/572; G06F 21/575; H04L 63/20; H04L 9/3263
See application file for complete search history.

(56) References Cited

U.S. PATENT DOCUMENTS

| | | | | |
|---|---|---|---|---|
| 2008/0104401 | A1* | 5/2008 | Miyamoto | H04L 63/0442 713/175 |
| 2018/0075242 | A1* | 3/2018 | Khatri | H04L 9/3263 |
| 2018/0349894 | A1* | 12/2018 | Patrinos | G06Q 20/383 |
| 2019/0018966 | A1* | 1/2019 | Khatri | G06F 21/575 |
| 2019/0236278 | A1* | 8/2019 | Martinez | G06F 21/44 |
| 2019/0260595 | A1* | 8/2019 | Walton | H04L 9/3268 |
| 2019/0363894 | A1* | 11/2019 | Kumar Ujjwal | H04L 9/3268 |

OTHER PUBLICATIONS

Cooper, D. et al. "Internet X.509 Public Key Infrastructure Certificate and Certificate Revocation List (CRL) Profile" (RFC 5280), May 2008. (Year: 2008).*

* cited by examiner

*Primary Examiner* — Michael Simitoski
(74) *Attorney, Agent, or Firm* — Jackson Walker L.L.P.

(57) ABSTRACT

An information handling system may include a processor and a basic input/output system communicatively coupled to the processor and embodied by executable instructions embodied in non-transitory computer readable media, the instructions configured to, when executed by the processor: identify, for a firmware image, a secure boot certificate; identify, for the secure boot certificate, a certificate use policy; determine whether the certificate use policy permits verification of the firmware image using the secure boot certificate; and allow the firmware image to be verified with the secure boot certificate if the certificate use policy permits verification of the firmware image using the secure boot certificate.

15 Claims, 7 Drawing Sheets

| ATTRIBUTE | STRING DESIGNATOR | OPTIONAL ATTRIBUTE TOKEN VALUE |
|---|---|---|
| OROM | OROM | 0x01 |
| BOOT LOADER | BOOTLOADER | 0x02 |
| EFI APPLICATION | APP | 0x03 |
| PEI EFI CODE | PEI | 0x04 |
| DXE EFI CODE | DXE | 0x05 |
| SMM EFI CODE | SMM | 0x06 |
| RECOVERY CODE | RECOVERY | 0x07 |
| VENDOR SPECIFIC | <VENDOR DESIGNATOR> | <VARIES> |
| OTHER TYPES | TBD | TBD |

SYSTEMS AND METHODS FOR SECURE CERTIFICATE USE POLICIES

TECHNICAL FIELD

The present disclosure relates in general to information handling systems, and more specifically to systems and methods for secure certificate use policies in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Protecting information handling systems from malicious code and malicious actors has become increasingly important, and providers (e.g., designers, manufacturers, vendors, etc.) of information handling systems and information handling system components often equip such information handling systems and components with security features to minimize or eliminate the risk of malicious attacks. For example, information handling systems equipped with a Unified Extensible Firmware Interface (UEFI) may verify that information handling system firmware is digitally signed, reducing the risk of malicious firmware rootkits. Further, Secure Boot-enabled UEFI systems may verify a boot loader signature to determine whether the boot loader is signed with a trusted certificate. Thus, if a rootkit or other item of malware replaces or tampers with the boot loader, the UEFI may prevent the boot loader from executing, thus preventing such malicious code from hijacking a boot process while concealing itself from an operating system.

Secure Boot comprises a plurality of certificate databases stored in firmware. These databases may include certificates and hashes that are used to authenticate the integrity of firmware and operating system bootloader images. These databases may include an allowed database, a restricted database, as well as a time-based database and a recovery database. These databases serve as a high-level permission for certificate use. However, there are several layers of firmware that are verified with these certificates.

A disadvantage of such approach is that once a certificate is inserted into the database, such certificates may be used to authenticate any firmware or bootloader that is used on the platform without limitations. For example, a certificate that is solely intended to verify a bootloader image for an operating system has the same authority and privilege to verify low-level UEFI code. This makes it possible for any certificate added to the Secure Boot database to verify any code that can be launched on the system. Thus, this approach may leave a system susceptible to privilege-type attacks.

SUMMARY

In accordance with the teachings of the present disclosure, the disadvantages and problems associated with securing boot certificates may be reduced or eliminated.

In accordance with embodiments of the present disclosure, an information handling system may include a processor and a basic input/output system communicatively coupled to the processor and embodied by executable instructions embodied in non-transitory computer readable media, the instructions configured to, when executed by the processor: identify, for a firmware image, a secure boot certificate; identify, for the secure boot certificate, a certificate use policy; determine whether the certificate use policy permits verification of the firmware image using the secure boot certificate; and allow the firmware image to be verified with the secure boot certificate if the certificate use policy permits verification of the firmware image using the secure boot certificate.

In accordance with these and other embodiments of the present disclosure, a method may include, in a basic input/output system of an information handling system: identifying, for a firmware image, a secure boot certificate; identifying, for the secure boot certificate, a certificate use policy; determining whether the certificate use policy permits verification of the firmware image using the secure boot certificate; and allowing the firmware image to be verified with the secure boot certificate if the certificate use policy permits verification of the firmware image using the secure boot certificate.

In accordance with these and other embodiments of the present disclosure an article of manufacture may include a computer readable medium and computer-executable instructions carried on the computer readable medium, the instructions readable by a processor, the instructions, when read and executed, for causing the processor to, in a basic input/output system of an information handling system: identify, for a firmware image, a secure boot certificate; identify, for the secure boot certificate, a certificate use policy; determine whether the certificate use policy permits verification of the firmware image using the secure boot certificate; and allow the firmware image to be verified with the secure boot certificate if the certificate use policy permits verification of the firmware image using the secure boot certificate.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 6, wherein like numbers are used to indicate like and corresponding parts. For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more busses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), busses, memories, I/O devices and/or interfaces, storage resources, network interfaces, motherboards, and/or any other components and/or elements of an information handling system.

Figure 1:
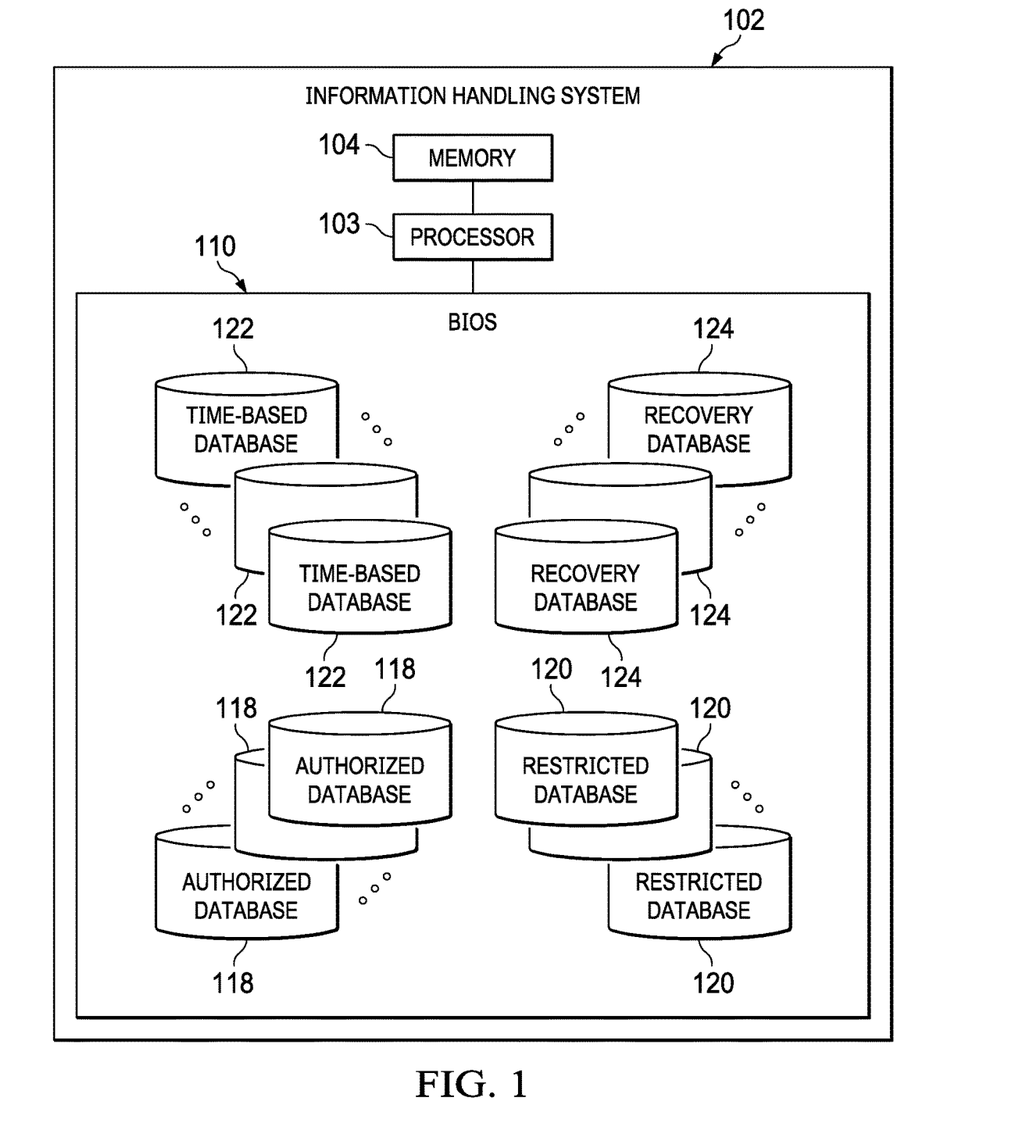
FIG. 1 illustrates a block diagram of an example information handling system, in accordance with embodiments of the present disclosure.

FIG. 1 illustrates a block diagram of an example information handling system 102, in accordance with certain embodiments of the present disclosure. In some embodiments, information handling system 102 may be a server. In other embodiments, information handling system 102 may be a personal computer (e.g., a desktop computer or a portable computer). As depicted in FIG. 1, information handling system 102 may include a processor 103, a memory 104 communicatively coupled to processor 103, and a BIOS 110 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

BIOS 110 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a UEFI. In some embodiments, BIOS 110 may be implemented as a program of instructions that may be read by and executed on processor 103 to carry out the functionality of BIOS 110. In these and other embodiments, BIOS 110 may comprise boot firmware configured to be the first code executed by processor 103 when information handling system 102 is booted and/or powered on. As part of its initialization functionality, BIOS code may be configured to set components of information handling system 102 into a known state, so that one or more applications (e.g., an operating system or other application programs) stored on compatible media (e.g., memory 104) may be executed by processor 103 and given control of information handling system 102.

As shown in FIG. 1, BIOS 110 may have stored thereon one or more authorized databases 118, one or more restricted databases 120, one or more time-based databases 122, and one or more recovery databases 124. Although authorized databases 118, unauthorized databases 120, time-based databases 122, and recovery databases 124 are depicted in FIG.

1 as integral to BIOS 110, in some embodiments one or more of such components may be stored on computer-readable media external to but accessible by BIOS 110.

An authorized database 118 may include any list, table, database, map, or other data structure setting forth a list of allowable keys to validate digital signatures of firmware, drivers, or other executable code to be executed in connection with information handling system 102. In some embodiments, an authorized database 118 may comprise a DB as defined in the UEFI specification.

A restricted database 120 may include any list, table, database, map, or other data structure setting forth a list of keys that when used to digitally sign firmware, drivers, or other executable code, are to be refused execution in connection with an operating system. In some embodiments, a restricted database 120 may comprise a DBX as defined in the UEFI specification.

A time-based database 122 may include any list, table, database, map, or other data structure setting forth a list of allowable keys to validate digital signatures of firmware, drivers, or other executable code to be executed in connection with information handling system 102, such execution limited to a particular time of execution. In some embodiments, a time-based database 122 may comprise a DBT as defined in the UEFI specification.

A recovery database 124 may include any list, table, database, map, or other data structure setting forth a list of allowable keys to validate digital signatures of firmware, drivers, or other executable code to be executed in connection with a recovery (e.g., of firmware, operating system, etc.) of information handling system 102. In some embodiments, a recovery database 124 may comprise a DBR as defined in the UEFI specification.

In operation, BIOS 110 may, in accordance with user configuration, create certificate use policies (CUPs) for Secure Boot certificates to control the use scope and privilege of the certificates. These CUPs may be applicable to certificates installed into Secure Boot certificate databases (e.g., authorized databases 118, unauthorized databases 120, time-based databases 122, and recovery databases 124), as well as extended certificates, and external certificate databases. A CUP may be used as an additional mechanism to verify if a certificate is authorized to be used for verifying a specific firmware and/or bootloader type and/or other firmware component. The certificate use policy will also extend to verification of certificate provisioning. Such approach may enable a mechanism to limit the scope of certificates and apply least-privilege security practice to the certificates. Accordingly, such approach may prevent the use of certain certificates for specific code image types in order to limit the privilege and scope of the certificates. Such approach may also enable a mechanism to incorporate customer and special purpose certificates with limited use-policies without compromising the security of the rest of information handling system 102.

In accordance with embodiments of the present disclosure, CUPs may comprise three major components:
1. X.509 embedded CUP attributes
2. Integrated CUP (standalone policy)
3. BIOS Setup Configuration Certificate Use Controls The X.509 embedded certificate attribute may embed CUPs within an X.509 certificate itself. The X.509 embedded certificate attribute may make use of, for example, the X.509 certificate format arbitrary extension field as described in Internet Engineering Task Force Request for Comment 3280.

The integrated CUP may provide a secondary mechanism to apply policies to certificates that do not support X.509 embedded CUP extensions, as well as a mechanism to override policies in the X.509 embedded CUP extensions. Supplemental to the integrated CUP may be the use of BIOS setup configuration controls to direct behavior of policies based on user configuration, as described in greater detail below.

Figure 2:
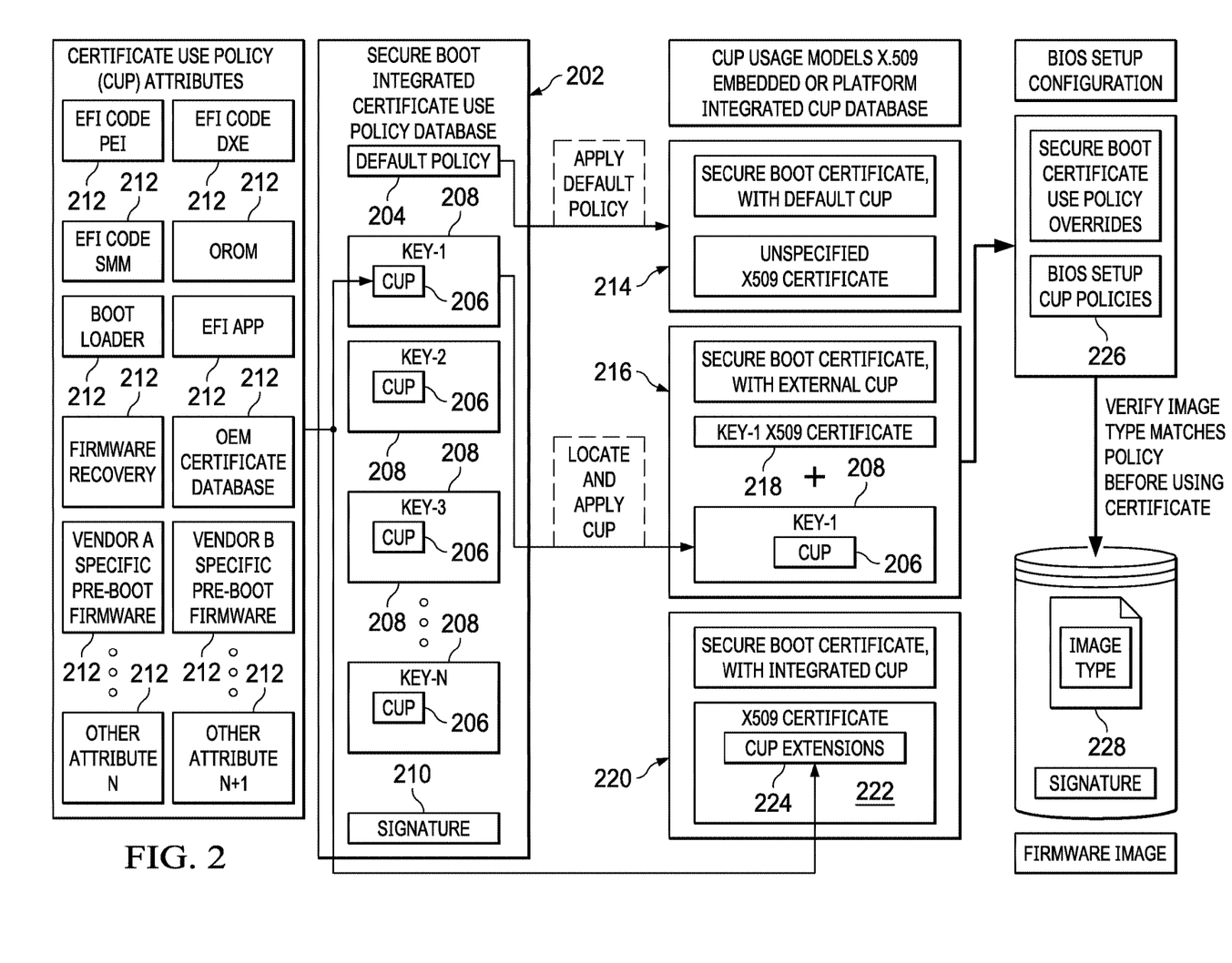
FIG. 2 sets forth a high-level flow diagram depicting application and use of certificate use policies, in accordance with embodiments of the present disclosure.

FIG. 2 sets forth a high-level flow diagram depicting application and use of CUPs, in accordance with embodiments of the present disclosure. As shown in FIG. 2, a Secure Boot Integrated CUP database 202 may include a default policy 204 and a plurality of CUPs 206 each signed with a respective key 208. Secure Boot Integrated CUP database 202 may also be signed with a digital signature 210. As also shown in FIG. 2, each CUP 206 may include one or more CUP attributes 212, which may define permissions for such CUP 206.

From Secure Boot Integrated CUP database 202, BIOS 110 may construct CUP usage models including X.509 embedded CUP attributes and/or a platform-integrated CUP database. For example, BIOS 110 may apply default policy 204 to Secure Boot certificate 214 with a default CUP. As another example, BIOS 110 may apply a CUP 206 to a X.509 certificate 218 associated with the key 208 associated with the CUP 206 to generate a Secure Boot certificate 216 with an external CUP. As a further example, BIOS 110 may directly apply a CUP 212 to create a Secure Boot certificate 220 with integrated CUP, such Secure Boot certificate 220 comprising an X.509 certificate 222 with CUP extensions 224 based on the applied CUP 212.

As further shown in FIG. 2, a BIOS setup configuration utility executing within BIOS 110 may allow a user to implement Secure Boot CUP overrides to create BIOS setup CUP policies 226 that may override policies set forth in Secure Boot certificates 214, 216, and/or 220.

Further, BIOS 110 may verify that a firmware image 228 matches a CUP for a certificate (e.g., one of Secure Boot certificates 214, 216, and/or 220) before allowing the certificate to be used in connection with firmware image 228.

Figure 3:
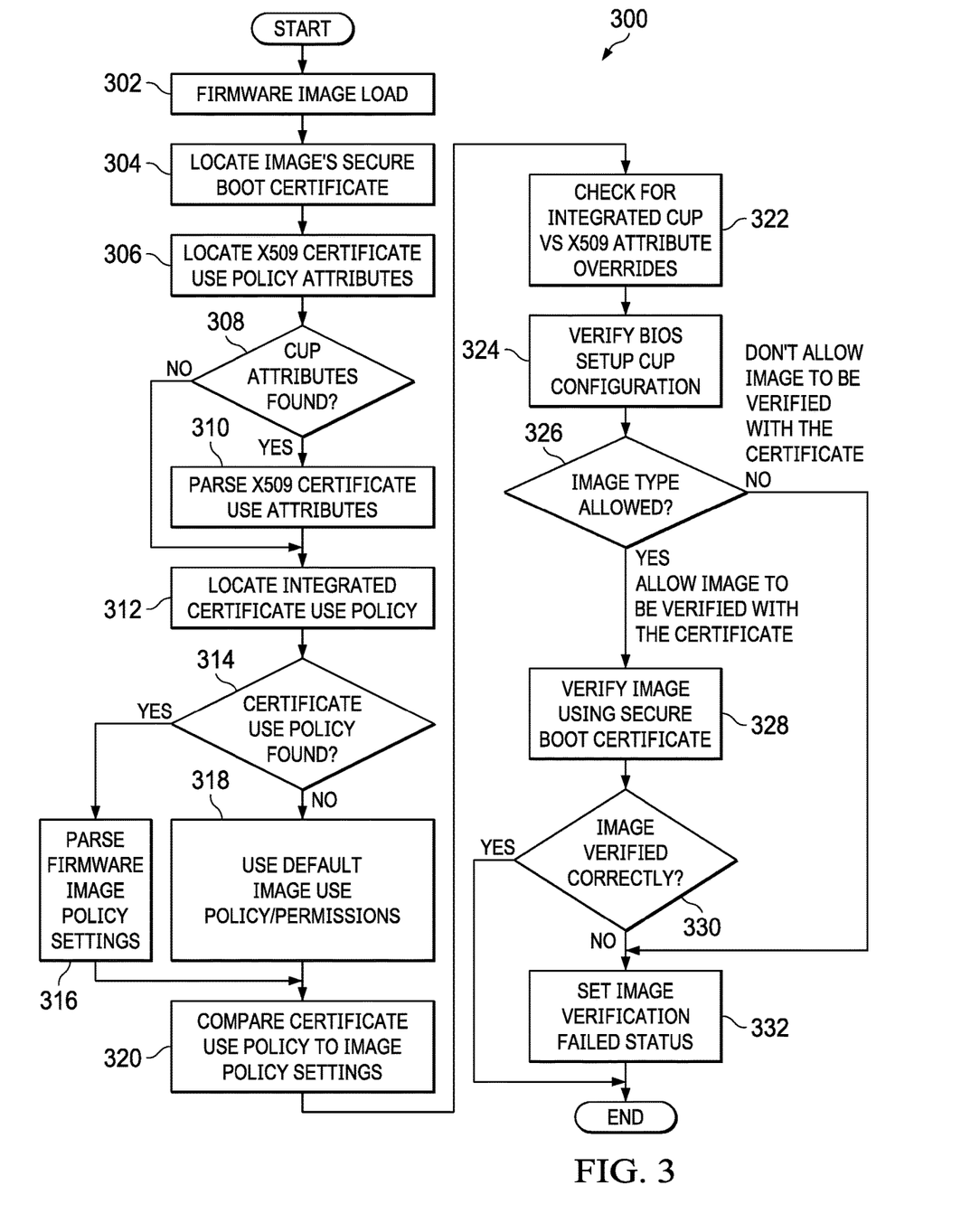
FIG. 3 illustrates a flow chart of an example method for applying certificate use policies, in accordance with certain embodiments of the present disclosure.

FIG. 3 illustrates a flow chart of an example method 300 for applying certificate use policies, in accordance with certain embodiments of the present disclosure. According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, a firmware image 228 may load. At step 304, BIOS 110 may load the Secure Boot certificate associated with firmware image 228. At step 306, BIOS 110 may locate X.509 CUP attributes 212. At step 308, BIOS 110 may determine if CUP attributes 212 for the Secure Boot certificate are found. If CUP attributes are found, method 300 may proceed to step 310. Otherwise, method 300 may proceed to step 312.

At step 310, BIOS 110 may parse, extract and interpret how to use certificate attributes embedded in the Secure Boot certificate. At step 312, BIOS 110 may locate an integrated CUP for the Secure Boot certificate. At step 314, BIOS 110 may determine if an integrated CUP for the Secure Boot certificate is found. If an integrated CUP for the Secure Boot certificate is found, method 300 may proceed to step 316. Otherwise, method 300 may proceed to step 318.

At step 316, BIOS 110 may parse firmware image policy settings. At step 318, BIOS 110 may use a default image use policy and/or permissions (e.g., Secure Boot certificate 214 with default CUP).

At step 320, BIOS 110 may compare CUP to image policy settings. At step 322, BIOS 110 may check for integrated CUP versus X.509 attribute overrides. At step 324, BIOS 110 may verify BIOS setup CUP configuration. At step 326, BIOS 110 may determine whether an image type of firmware image 228 is allowed with the certificate. If the image type of firmware image 228 is disallowed with the certificate, method 300 may proceed to step 332. Otherwise, method 300 may proceed to step 328.

At step 328, BIOS 110 may verify firmware image 228 using the Secure Boot certificate. At step 330, BIOS 110 may determine if the image was correctly verified using the Secure Boot certificate. If the image was correctly verified using the Secure Boot certificate, BIOS 110 may allow Secure Boot to verify code of firmware 228 using the certificate, and method 300 may end. Otherwise, method 300 may proceed to step 332.

At step 332, BIOS 110 may set a status for firmware image 228 to indicate that its verification has failed, and will prevent execution of firmware image using the Secure Boot certificate. After completion of step 332, method 300 may end.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

Figure 4:
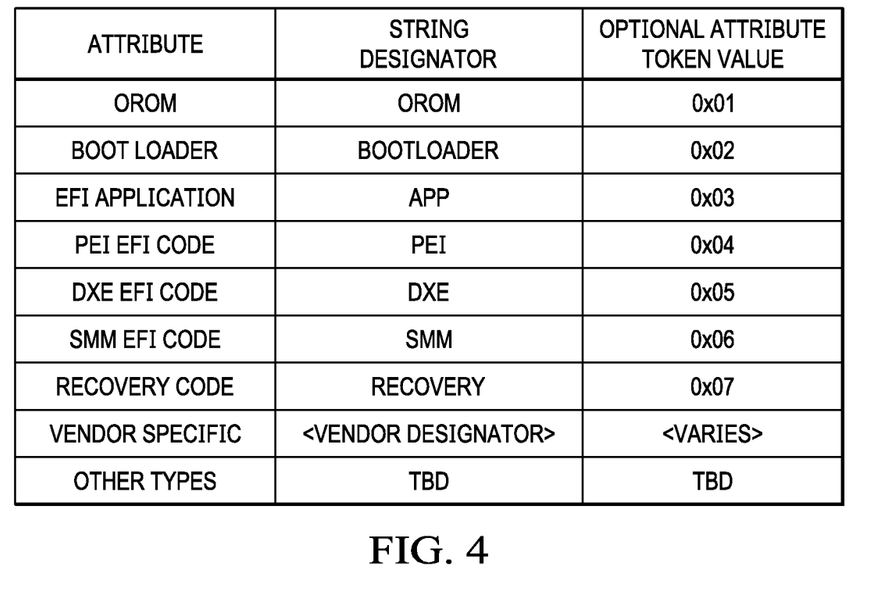
FIG. 4 sets forth a table of example certificate use policy attributes, in accordance with embodiments of the present disclosure.

As described above, CUP attributes 212 may be associated with permission for using certificates for specific UEFI code, and may be analogous to access control lists used in connection with file systems. Certificates may be assigned specific attributes designating the permissions versus the UEFI code type accesses and/or use allowed. FIG. 4 sets forth a table of example CUP attributes 212, in accordance with embodiments of the present disclosure.

Figure 5A:
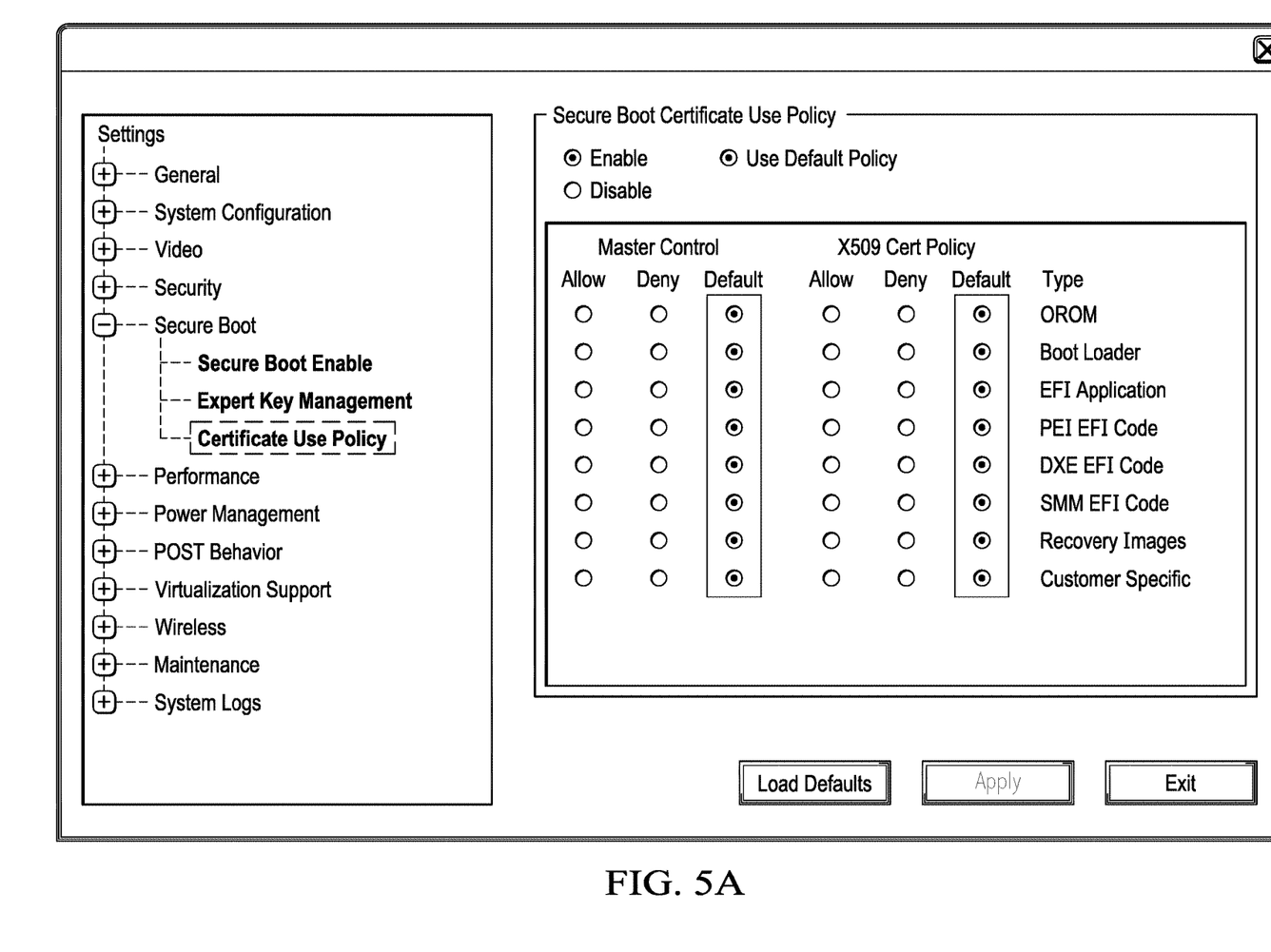
FIG. 5A depicts an example user interface screen that may be presented to a user within the BIOS setup configuration utility, in which default settings are selected for certificate use policies, in accordance with embodiments of the present disclosure.
Figure 5B:
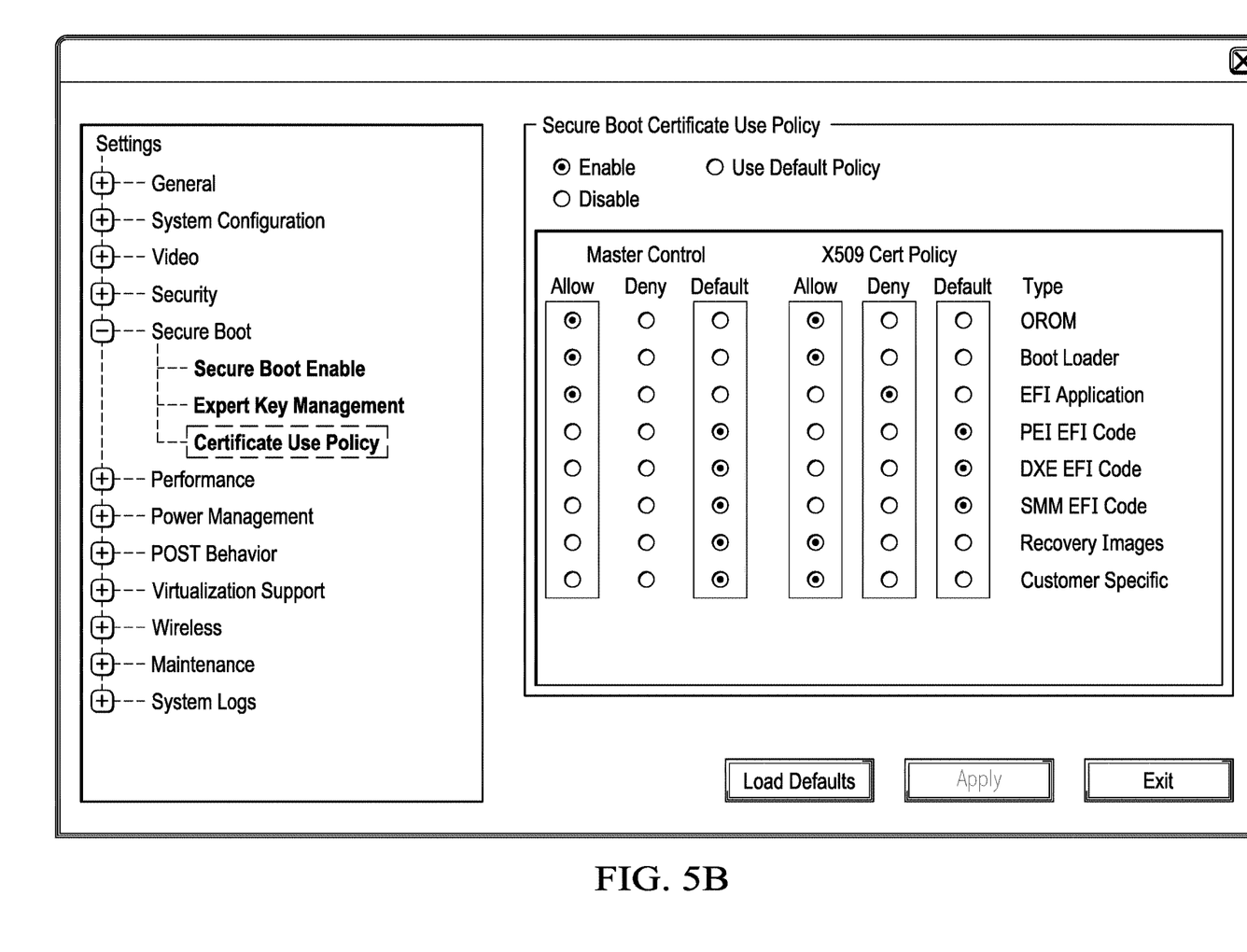
FIG. 5B depicts the example user interface screen of FIG. 5A, in which custom settings are selected for certificate use policies, in accordance with embodiments of the present disclosure.

As described above, a BIOS setup configuration utility executing within BIOS 110 may allow a user to configure CUP policies 226 (e.g., that may override policies set forth in Secure Boot certificates 214, 216, and/or 220). FIG. 5A depicts an example user interface screen that may be presented to a user within the BIOS setup configuration utility, in which default settings are selected for CUPs, in accordance with embodiments of the present disclosure. FIG. 5B depicts the example user interface screen of FIG. 5A, in which custom settings are selected for CUPs, in accordance with embodiments of the present disclosure.

Thus, the BIOS setup configuration utility may include configuration options that may provide a user with additional controls for CUPs. The BIOS setup configuration utility may establish minimum allowed policies that may be used on information handling system 102, and may establish whether external certificate-based CUPs and/or integrated CUPs may be used. The BIOS setup configuration utility may allow for override of X.509 certificate policies as well as built-in default BIOS policies. Accordingly, the BIOS setup configuration utility may provide additional access control to the customer to suit their environment and threat model.

To implement external CUPs, X.509 certificate arbitrary extensions may be used. Policy attributes may be encoded into a certificate using a string format, and individual attributes are arranged as individual entries, separated by a delimiter, such as a comma. An attribute may also be marked with a "critical" qualifier to designate the policy entry as a critical extension, and the extension may be designated with an object identifier (OID) value (e.g., 1.2.3.4). Below sets forth an example certificate generation configuration using X.509 certificate arbitrary extensions:

```
Basic OpenSSL config file   (arbext.cnf)
   [ req ]
   ...
   x509_extensions = extensions
   ...
   [ extensions ]
   1.2.3.4=critical,ASN1:SEQUENCE:cup_sect
   1.2.3.5=critical,ASN1:SEQUENCE:cup_sect2
   1.2.3.6=critical,ASN1:SEQUENCE:cup_sect3
   [cup_sect]    #using attribute strings
   HEADER   =   UTF8:Secure Boot Certificate Use Policy
   CUP1     =   UTF8:CUP1=OROM,Bootloader
   CUP2     =   UTF8:CUP2=DXE
   [cup_sect2]   #using Attribute Tokens
   HEADER2  =   UTF8:Secure Boot Certificate Use Policy
   CUP3     =   UTF8:CUP4=01, 02, 05 #OROM, Bootloader, DXE
   CUP4     =   UTF8:CUP5=04, 05, 06 #PEI, DXE, SMM
   [cup_sect3]   #Vendor specific
   HEADER2  =   UTF8:Secure Boot Certificate Use Policy
   CUP5     =   UTF8:CUP4=Vendor1
   CUP6     =   UTF8:CUP5=Vendor2
```

Figure 6:
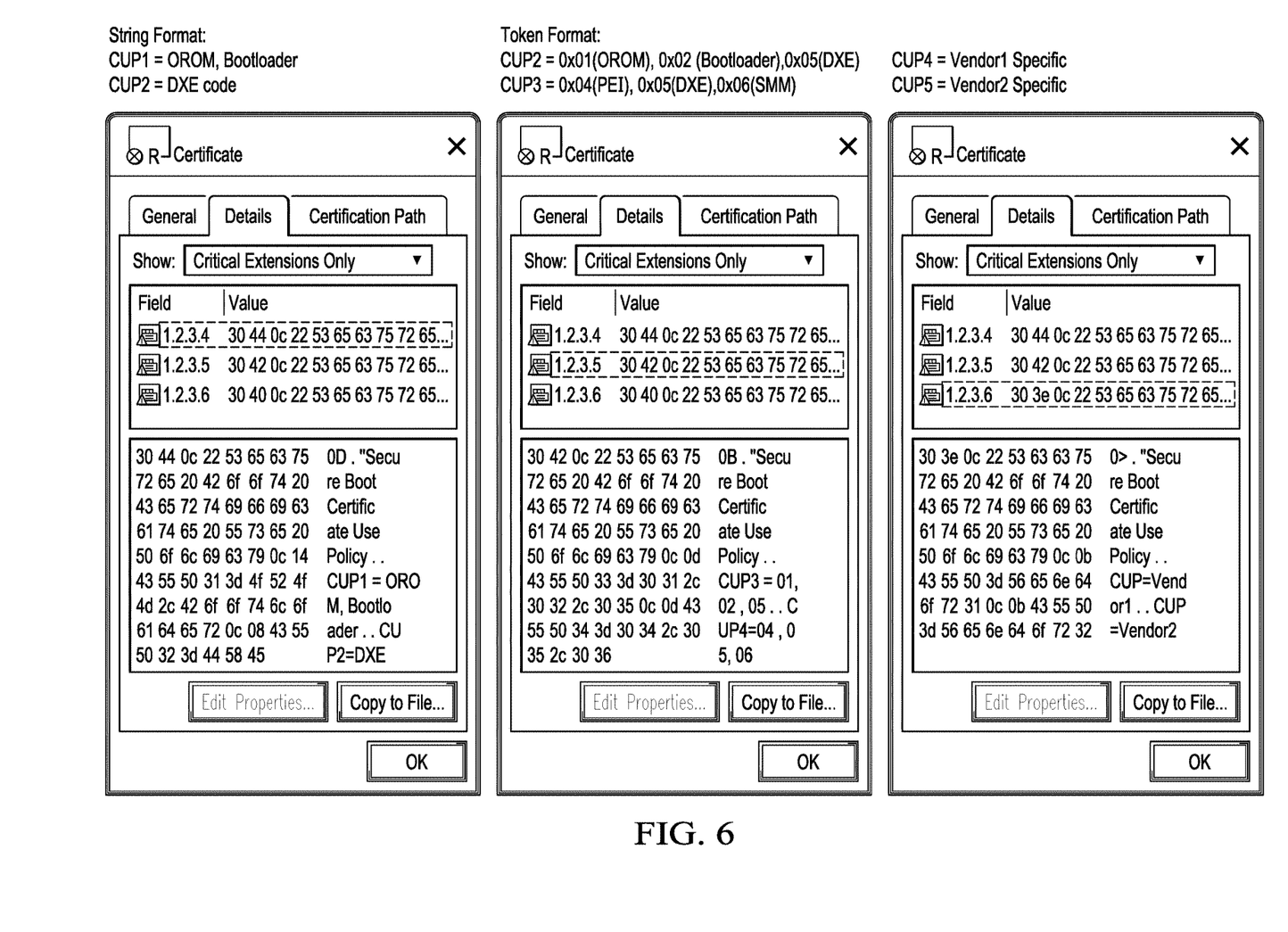
FIG. 6 depicts example views of different certificates via a certificate viewer, in accordance with embodiments of the present disclosure.

FIG. 6 depicts example views of different certificates via a certificate viewer, in accordance with embodiments of the present disclosure.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
    a processor; and
    a basic input/output system communicatively coupled to the processor and embodied by executable instructions embodied in non-transitory computer readable media, the instructions configured to, when executed by the processor:
        identify, for a firmware image, a secure boot certificate;
        identify, for the secure boot certificate, a certificate use policy, wherein the certificate use policy is integrated with the secure boot certificate and overrides attributes of the certificate use policy embedded in the secure boot certificate;
        determine whether the certificate use policy permits verification of the firmware image using the secure boot certificate; and
        allow the firmware image to be verified with the secure boot certificate if the certificate use policy permits verification of the firmware image using the secure boot certificate.

2. The information handling system of claim 1, wherein the basic input/output system is further configured to disallow the firmware image to be verified with the secure boot certificate if the certificate use policy does not permit verification of the firmware image using the secure boot certificate.

3. The information handling system of claim 1, wherein attributes of the certificate use policy are embedded in a certificate format arbitrary extension field of the secure boot certificate.

4. The information handling system of claim 1, wherein the certificate use policy is integrated with the secure boot certificate.

5. The information handling system of claim 1, wherein the certificate use policy is a default policy associated with the information handling system.

6. A method comprising, in a basic input/output system of an information handling system:
    identifying, for a firmware image, a secure boot certificate;
    identifying, for the secure boot certificate, a certificate use policy, wherein the certificate use policy is integrated with the secure boot certificate and overrides attributes of the certificate use policy embedded in the secure boot certificate;
    determining whether the certificate use policy permits verification of the firmware image using the secure boot certificate; and
    allowing the firmware image to be verified with the secure boot certificate if the certificate use policy permits verification of the firmware image using the secure boot certificate.

7. The method of claim 6, further comprising disallowing the firmware image to be verified with the secure boot certificate if the certificate use policy does not permit verification of the firmware image using the secure boot certificate.

8. The method of claim 6, wherein attributes of the certificate use policy are embedded in a certificate format arbitrary extension field of the secure boot certificate.

9. The method of claim 6, wherein the certificate use policy is integrated with the secure boot certificate.

10. The method of claim 6, wherein the certificate use policy is a default policy associated with the information handling system.

11. An article of manufacture comprising:
    a non-transitory computer readable medium; and
    computer-executable instructions carried on the non-transitory computer readable medium, the instructions readable by a processor, the instructions, when read and executed, for causing the processor to, in a basic input/output system of an information handling system:
        identify, for a firmware image, a secure boot certificate;
        identify, for the secure boot certificate, a certificate use policy, wherein the certificate use policy is integrated with the secure boot certificate and overrides attributes of the certificate use policy embedded in the secure boot certificate;
        determine whether the certificate use policy permits verification of the firmware image using the secure boot certificate; and
        allow the firmware image to be verified with the secure boot certificate if the certificate use policy permits verification of the firmware image using the secure boot certificate.

12. The article of claim 11, the instructions for further causing the processor to disallow the firmware image to be verified with the secure boot certificate if the certificate use policy does not permit verification of the firmware image using the secure boot certificate.

13. The article of claim 11, wherein attributes of the certificate use policy are embedded in a certificate format arbitrary extension field of the secure boot certificate.

14. The article of claim 11, wherein the certificate use policy is integrated with the secure boot certificate.

15. The article of claim 11, wherein the certificate use policy is a default policy associated with the information handling system.

* * * * *